US009227129B2

(12) United States Patent
Ishii et al.

(10) Patent No.: US 9,227,129 B2
(45) Date of Patent: Jan. 5, 2016

(54) METHOD AND SYSTEM FOR CHARACTERIZING GOLF BALL STRIKING ABILITY

(75) Inventors: Hideyuki Ishii, Portland, OR (US); Nicholas A. Leech, Aloha, OR (US); Roland Rotheneder, Vienna (AT)

(73) Assignee: Nike, Inc., Beaverton, OR (US)

( * ) Notice: Subject to any disclaimer, the term of this patent is extended or adjusted under 35 U.S.C. 154(b) by 1012 days.

(21) Appl. No.: 13/329,022

(22) Filed: Dec. 16, 2011

(65) Prior Publication Data

US 2013/0157772 A1 Jun. 20, 2013

(51) Int. Cl.
*A63B 69/36* (2006.01)
*A63B 24/00* (2006.01)

(52) U.S. Cl.
CPC .......... *A63B 69/36* (2013.01); *A63B 2024/0009* (2013.01); *A63B 2024/0015* (2013.01); *A63B 2024/0034* (2013.01); *A63B 2069/3605* (2013.01); *A63B 2220/30* (2013.01); *A63B 2220/35* (2013.01)

(58) Field of Classification Search
USPC ......... 473/131, 223, 289, 290, 383, 384, 407, 473/409
See application file for complete search history.

(56) References Cited

U.S. PATENT DOCUMENTS

| | | | |
|---|---|---|---|
| 4,063,259 A * | 12/1977 | Lynch et al. .................. 396/335 |
| 4,375,887 A * | 3/1983 | Lynch et al. .................. 473/409 |
| 6,431,990 B1 | 8/2002 | Manwaring | |
| 6,561,917 B2 | 5/2003 | Manwaring | |
| 6,658,371 B2 * | 12/2003 | Boehm et al. ................. 702/182 |
| 6,697,820 B1 | 2/2004 | Tarlie | |
| 7,264,554 B2 | 9/2007 | Bentley | |
| 7,736,242 B2 | 6/2010 | Stites et al. | |
| 7,766,737 B2 | 8/2010 | Sanders | |
| 7,837,572 B2 | 11/2010 | Bissonnette et al. | |
| 8,142,300 B2 * | 3/2012 | Iwatsubo et al. .............. 473/222 |
| 8,409,024 B2 * | 4/2013 | Marty et al. .................. 473/150 |
| 2006/0008116 A1 | 1/2006 | Kiraly et al. | |
| 2006/0029916 A1 | 2/2006 | Boscha | |
| 2006/0040756 A1 | 2/2006 | Kestler | |
| 2006/0287118 A1 * | 12/2006 | Wright et al. ................. 473/131 |
| 2008/0182685 A1 | 7/2008 | Marty et al. | |
| 2008/0220891 A1 * | 9/2008 | Gobush et al. ............... 473/221 |
| 2009/0036237 A1 | 2/2009 | Nipper et al. | |
| 2009/0326688 A1 | 12/2009 | Thomas et al. | |
| 2010/0004039 A1 | 1/2010 | Kelly, Jr. et al. | |

(Continued)

FOREIGN PATENT DOCUMENTS

JP 2008295654 12/2008

OTHER PUBLICATIONS

International Search Report and Written Opinion mailed Apr. 29, 2013 for PCT Application No. PCT/US2012/068185.

*Primary Examiner* — Nini Legesse
(74) *Attorney, Agent, or Firm* — Quinn Law Group, PLLC (57) ABSTRACT

Alternate characterizations of golf ball striking ability is provided, as well as methods for determining the alternate characterizations and systems for carrying out such determinations. Such methods may include performing one or more golf strikes to impart trajectories to one or more golf balls. Such methods may also include measuring each of the golf strikes to determine golf club head, golf ball speed, side spin angle, and offline angle, calculating a trajectory magnitude factor and a trajectory offline factor on the basis of the measurements, and reducing the trajectory magnitude factor by the trajectory offline factor.

10 Claims, 11 Drawing Sheets

(56) References Cited

U.S. PATENT DOCUMENTS

| | | |
|---|---|---|
| 2010/0009780 A1 | 1/2010 | Doherty et al. |
| 2010/0087936 A1 | 4/2010 | Roullier |
| 2010/0151956 A1 | 6/2010 | Swartz et al. |
| 2010/0304876 A1 | 12/2010 | Hohla et al. |
| 2011/0207560 A1 * | 8/2011 | Wright et al. ............ 473/407 |

* cited by examiner

METHOD AND SYSTEM FOR CHARACTERIZING GOLF BALL STRIKING ABILITY

BACKGROUND

Handicap numbers are used by golfers as measures of golfing ability. A handicap number is typically determined on the basis of a golfer's performance over a range of holes with respect to a predetermined par value associated with each hole. In calculating a handicap number, for example, the number of strokes a golfer must make to move a golf ball from a particular tee spot to the hole is first recorded for each hole of a golf course. The predetermined par value of the hole is then subtracted from this number. If the golfer must make more strokes to move the golf ball to the hole than the par number for that hole, the resulting number will be positive, whereas if the golfer requires fewer strokes than the par number, the resulting number will be negative. A handicap number is then calculated on the basis of the resulting numbers for the range of holes.

However, measures of golfing ability such as handicap numbers present certain problems. A first problem is that handicap numbers are calculated based upon specific performances against specific holes of specific golf courses under specific environmental conditions. Weather conditions and subtle differences between specific holes of various golf courses may make handicap numbers inherently difficult to compare. While handicap numbers may attempt to compensate for such difference by taking into account factors relating to the general difficulty of particular golf courses, for example, such handicap numbers may still not reflect differences in hole-to-hole difficulty.

Additionally, since handicap numbers are based upon the difference between an actual number of strokes required to move a ball to a hole and the par number associated with that hole, handicap numbers may be relatively coarsely-grained. That is, the difference in handicap number between two golfers may be relatively small, especially at higher ability levels.

Moreover, since handicap numbers may derive from data gathered and analyzed by individual golfers, the value of such numbers may be related to factors such as an individual golfer's diligence in gathering and accurately recording the required data, as well as the golfer's skill in deriving the proper handicap number on the basis of the data.

Furthermore, handicap numbers may only be of general assistance in selecting golf equipment suitable to improve a particular golfer's game. For example, it may generally be known that a particular piece of golf equipment such as a particular type of golf club or golf ball may improve the game of golfers at a particular ability level as measured by handicap, i.e., it may generally be known that a particular type of golf ball may improve the golf game of golfers of a certain handicap range. However, handicap numbers may not be useful in determining whether or how a particular piece of golf equipment may improve the golfing ability of a particular golfer.

Accordingly, there is a need for alternate characterizations of golf ball striking ability, as well as methods for determining the alternate characterizations, methods for selecting golf equipment on the basis of the alternate characterizations, and systems for carrying out such methods.

SUMMARY

In one aspect, a method for selecting a piece of golf equipment comprises steps of striking, measuring, establishing, determining, and selecting. In one step, the method includes striking (a) a first golf ball with a first golf club to impart a first trajectory to the first golf ball, and (b) a second golf ball with a second golf club to impart a second trajectory to the second golf ball. In another step, the method includes measuring one or more magnitude parameters and one or more offline parameters of the first trajectory and the second trajectory. In another step, the method includes establishing, for each of the first trajectory and the second trajectory, (a) a trajectory magnitude factor based upon the one or more magnitude parameters and (b) a trajectory offline factor based upon the one or more offline parameters. In another step, the method includes determining, for each of the first trajectory and the second trajectory, a striking ability rating based upon a difference between the trajectory magnitude factor and the trajectory offline factor. In another step, the method includes selecting (a) if the striking ability rating for the second trajectory is less than the striking ability rating for the first trajectory, a piece of golf equipment from a group consisting of the first golf ball and the first golf club, and (b) if the striking ability rating for the second trajectory is not less than the striking ability rating for the first trajectory, a piece of golf equipment from a group consisting of the second golf ball and the second golf club.

In another aspect, a method of characterizing golf ball striking ability includes steps of performing, measuring, determining, calculating, and reducing. In one step, the method includes performing a plurality of golf strikes, in each of which a golf club head strikes a golf ball to impart a trajectory to the golf ball. In another step, the method includes measuring each of the plurality of golf strikes to determine (a) a speed of the golf club head, (b) a speed of the golf ball, (c) a side spin angle of the golf ball, and (d) an offline angle of the trajectory of the golf ball for each of the plurality of golf strikes. In another step, the method includes determining (a) a composite golf club head speed, (b) a composite golf ball speed, (c) a composite side spin angle, and (d) a composite offline angle from the measurements of the plurality of golf strikes. In another step, the method includes calculating (a) a trajectory magnitude factor from a ratio of the golf club head speed to the golf ball speed and (b) a trajectory offline factor from a sum of the side spin angle and the offline angle. In another step, the method includes reducing the trajectory magnitude factor on the basis of an absolute value of the trajectory offline factor to determine a golf ball striking ability rating.

In another aspect, a method of characterizing a golf ball striking ability includes steps of performing, measuring, calculating, and reducing. In one step, the method includes performing a plurality of golf strikes in which each of a plurality of golf club heads strikes a golf ball to impart a trajectory to the golf ball. In another step, the method includes measuring, for each of the plurality of golf strikes, (a) a speed of the golf club head, (b) a speed of the golf ball, (c) a side spin angle of the golf ball, and (d) an offline angle of the trajectory of the golf ball for each of the plurality of golf strikes. In another step, the method includes calculating, for each of the plurality of golf strikes, (a) a trajectory magnitude factor from a ratio of the speed of the golf club head to the speed of the golf ball and (b) a trajectory offline factor from a sum of the side spin angle of the golf ball and the offline angle of the trajectory of the golf ball. In another step, the method includes reducing, for each of the plurality of golf strikes, the trajectory magnitude factor on the basis of an absolute value of the trajectory offline factor to determine a golf ball striking ability rating.

In another aspect, a golf ball striking ability characterization for use in a golf ball fitting system comprises at least a trajectory magnitude factor reduced by a trajectory offset factor. The trajectory magnitude factor includes a ratio of a speed of a golf club head to a speed of a golf ball. The trajectory offline factor includes a sum of (a) the side spin angle of the golf ball modified by a side spin scaling factor and (b) a trigonometric function of an offline angle of a trajectory of the golf ball. The speed of the golf club head, the speed of the golf ball, the side spin angle of the golf ball, and the offline angle of the trajectory of the golf ball are determined from measurements taken upon a plurality of golf strikes in which the golf club strikes the golf ball.

In another aspect, a system for evaluating golf ball striking ability for a computer comprises an automated measurement device, a database, a determining device, a calculating device, a reducing device, and an output device. The automated measurement device obtains measurements related to (a) a golf club head speed, (b) a golf ball speed, (c) a side spin angle, and (d) an offline angle. The database stores a plurality of golf strike parameter values. The determining device determines (a) the golf club head speed, (b) the golf ball speed, (c) the side spin angle, and (d) the offline angle from the measurements. The calculating device calculates (a) a trajectory magnitude factor from a ratio of the golf club head speed to the golf ball speed and (b) a trajectory offline factor from a sum of the side spin angle and the offline angle. The reducing device reduces the trajectory magnitude factor on the basis of an absolute value of the trajectory offline factor. The output device outputs the reduced trajectory magnitude factor.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale; instead, emphasis is placed upon illustrating the principles of the invention. Moreover, in the figures, like reference numerals designate corresponding parts throughout the different views.

DETAILED DESCRIPTION

A method for selecting a piece of golf equipment is provided. Also provided are a method of characterizing golf ball striking ability, a golf ball striking ability characterization for use in a golf ball fitting system, and a system for evaluating golf ball striking ability for a computer.

Figure 1:
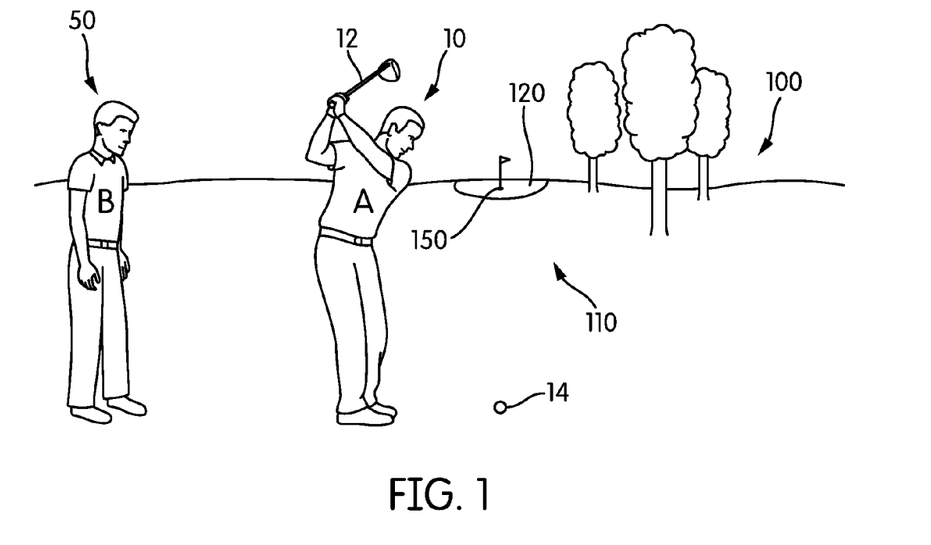
FIG. 1 depicts a first golfer using a first golf club to begin a first golf swing at a first golf ball on a golf course.

Golf ball striking ability can be characterized with respect to golf swings undertaken in a variety of different locations and under a variety of different conditions. For example, FIGS. 1-10 depict golf swings undertaken during a game of golf on a golf course 100. FIGS. 1-8 depict various moments in a game of golf being played by a first golfer 10 and a second golfer 50 on a fairway 110 of golf course 100. In FIG. 1, first golfer 10 is playing on a portion of fairway 110 close to green 120. First golfer 10 is beginning to swing a first golf club 12 at a first golf ball 14, aiming at a target spot 150, which is a hole on green 120. Since first golfer 10 is relatively far away from green 120 and target spot 150, first golf club 12 is a golf club capable of hitting a golf ball relatively long distances, such as a driver (i.e., a wood), or a low-numbered iron, or a hybrid club. Second golfer 50 is observing first golfer 10.

Figure 2:
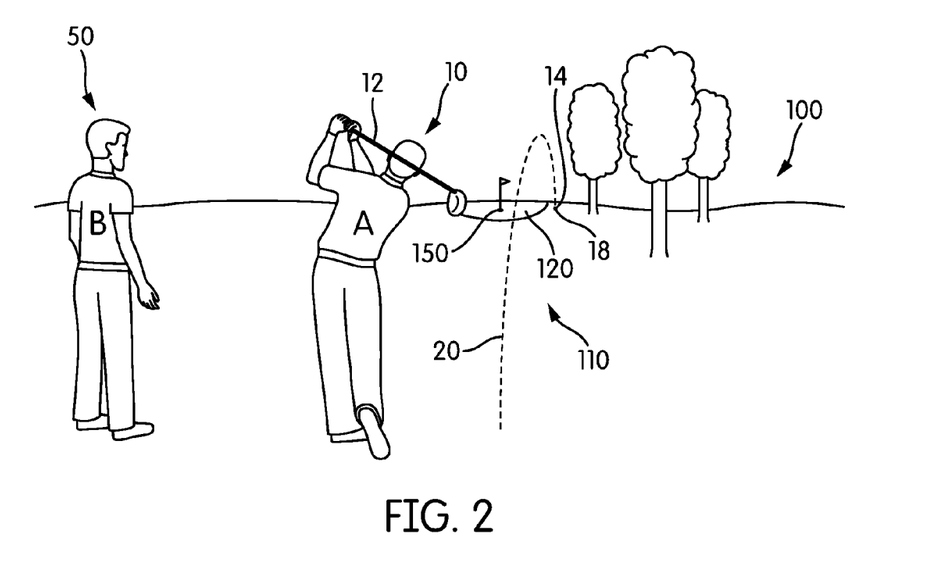
FIG. 2 depicts the first golfer having completed the first golf swing and having imparted a first trajectory to the first golf ball.
Figure 3:
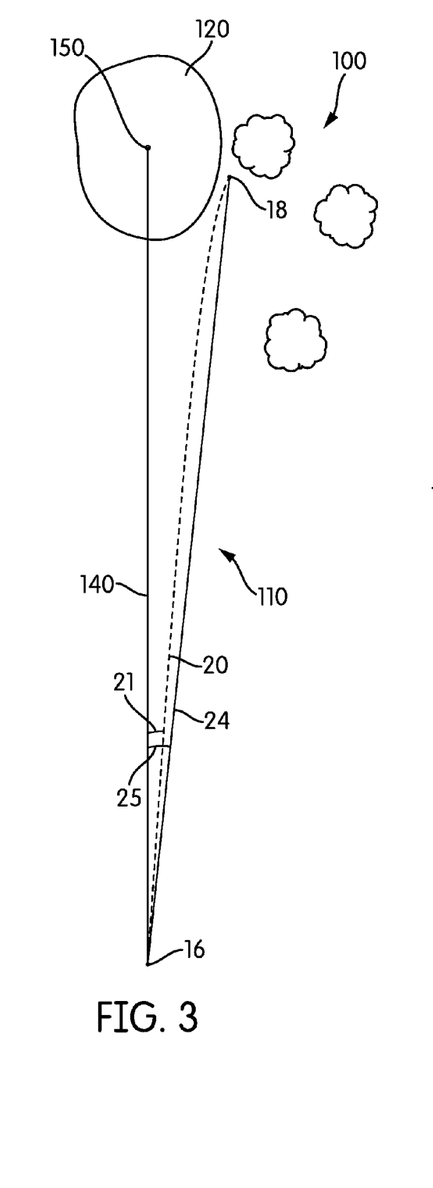
FIG. 3 is a top view of the golf course depicting the first trajectory.
Figure 4:
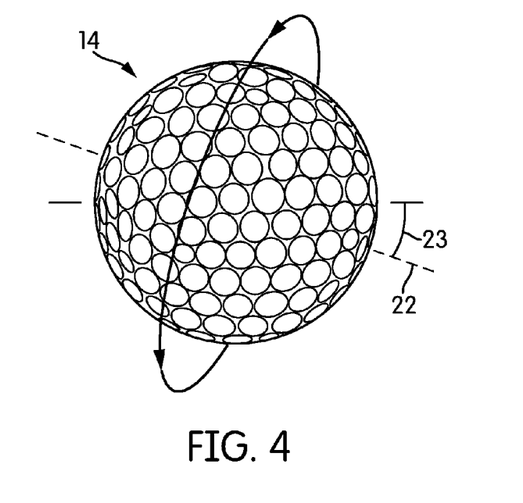
FIG. 4 is a rear view depicting the first golf ball in flight.

In FIG. 2, first golfer 10 has swung at and struck first golf ball 14 with first golf club 12, sending first golf ball 14 toward target spot 150 along first trajectory 20. First golf ball 14 lands and comes to rest at a first stopping spot 18. As depicted in FIGS. 3-4, first golf ball 14 does not follow a target trajectory 140 from a first lie spot 16 to target spot 150. Instead, first golf ball 14 follows first trajectory 20 to arrive at first stopping spot 18.

FIG. 4 depicts first golf ball 14 in flight from first lie spot 16 to first stopping spot 18. While in flight, first golf ball 14 has a back-spin about a first spin axis 22. The back-spin was imparted to first golf ball 14 by first golf club 12. First spin axis 22 is not horizontal, though. Instead, first spin axis 22 is at a first side spin angle 23 with respect to a horizontal axis. That is, first golf club 12 imparted a non-level back-spin to first golf ball 14.

If first side spin angle 23 was zero, and absent any wind, the golf swing may have been a push (since first golfer 10 is golfing right-handed; else, if first golfer 10 were golfing left-handed, the golf swing may have been a pull). However, since first side spin angle 23 is non-zero and positive (i.e., tilting slightly to the right), the golf swing may be a fade (or, if first golfer 10 were golfing left-handed, a draw). If first side spin angle 23 were great enough, the golf swing may have been a slice (or, if from a left-handed swing, a hook). Non-zero side-spin angles such as those associated with fades or slices (or with draws or hooks) may alter a trajectory of a golf ball in flight.

Notably, as depicted in FIG. 3, first trajectory 20 is not a straight line from first lie spot 16 to target spot 150. Instead, first trajectory 20 curves as first golf ball 14 flies toward target spot 150. More particularly, first trajectory 20 curves to the right. Some portion of this curvature is a result of a wind blowing from left to right. However, another portion of this curvature is a result of non-zero and positive first side spin angle 23 imparted to first golf ball 14 when struck by first golf club 12.

As depicted, first trajectory 20 has a first offline angle 21 relative to target trajectory 140, and the magnitude of first offline angle 21 changes during the flight of first golf ball 14. Near an initial portion of first trajectory 20, first offline angle 21 has some non-zero value. Thereafter, between the initial portion of first trajectory 20 and a final portion of first trajectory 20, first offline angle 21 relative to target trajectory 140 increases, in part due to the blowing wind and in part due to the spinning of first golf ball 14 about first spin axis 22 at non-zero first side spin angle 23. First offline angle 21 increases throughout first trajectory 20 until it is the same as a first actual angle 25 associated with a first actual distance 24 at a final portion of first trajectory 20.

Figure 5:
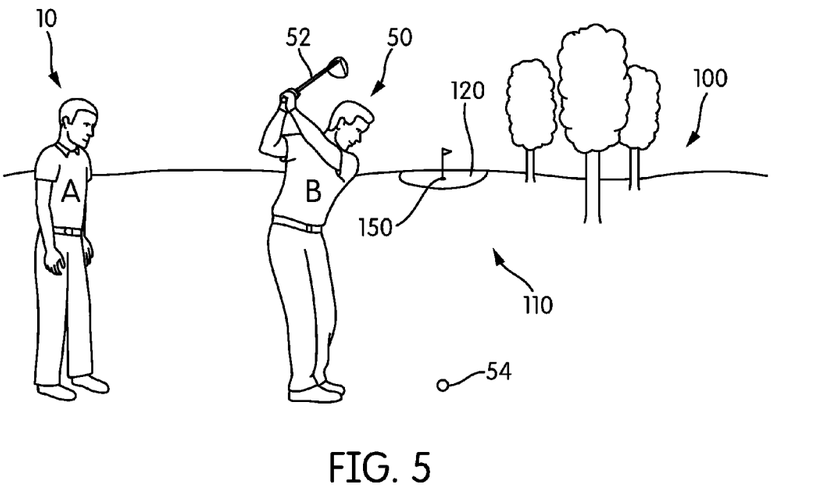
FIG. 5 depicts a second golfer using a second golf club to begin a second golf swing at a second golf ball on the golf course.

Proceeding, in FIG. 5, second golfer 50 is playing on the same portion of fairway 110. Second golfer 50 is beginning to swing a second golf club 52 at a second golf ball 54, which lies at roughly the same spot as first golf ball 14 in FIG. 1. Second golfer 50 is aiming at the same target spot 150 on green 120. From this distance, second golfer 50 has also chosen second golf club 52 to be a golf club capable of achieving relatively long distances, such as a driver, a low-numbered iron, or a hybrid club. First golfer 10 is, in turn, observing second golfer 50.

Figure 6:
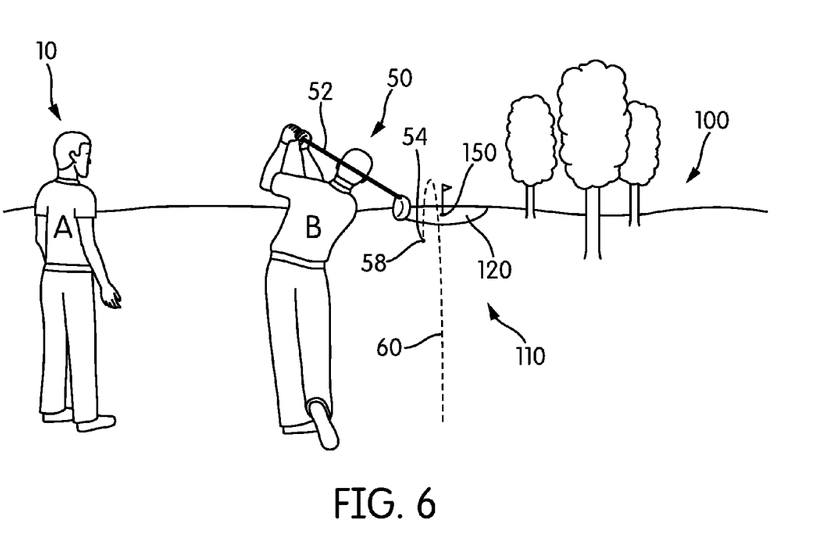
FIG. 6 depicts the second golfer having completed the second golf swing and having imparted a second trajectory to the second golf ball.
Figures 7, 8:
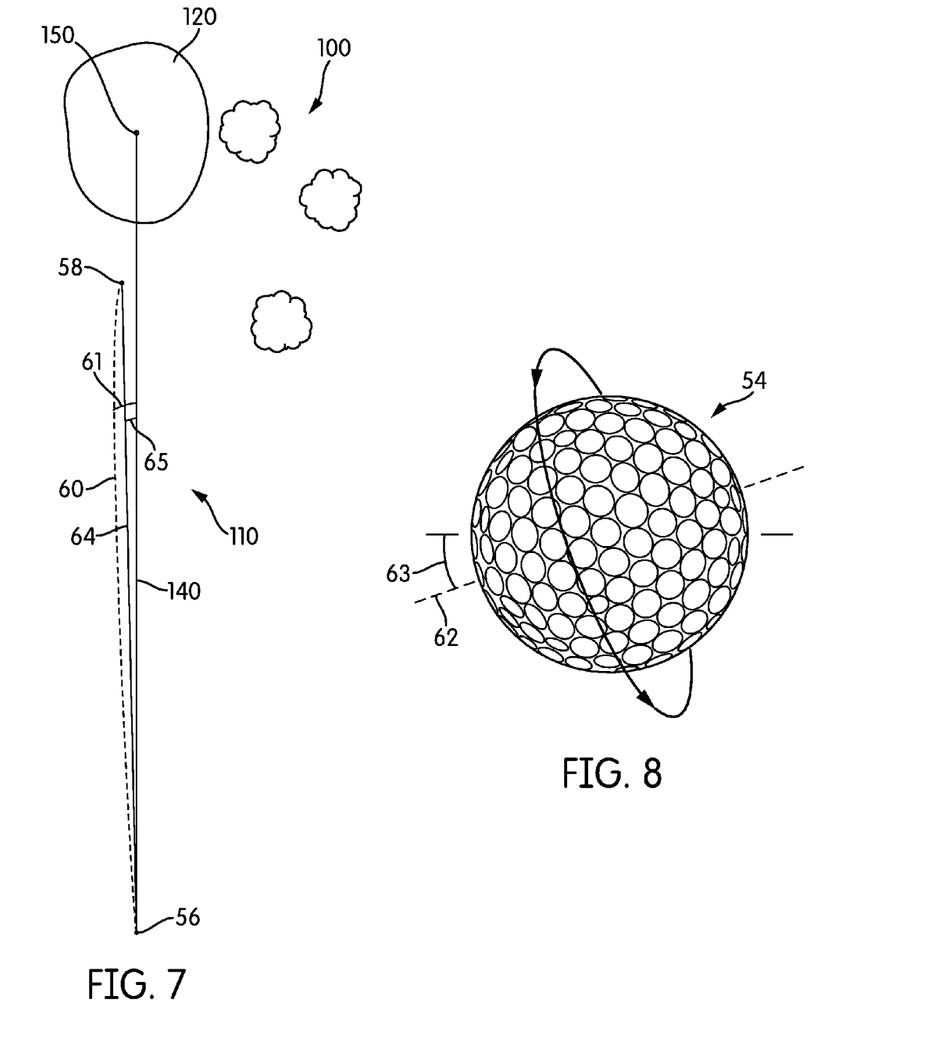
FIG. 7 is a top view of the golf course depicting the second trajectory.
FIG. 8 is a rear view depicting the second golf ball in flight.

In FIG. 6, second golfer 50 has swung second golf club 52 and has struck second golf ball 54, imparting a second trajectory 60 to second golf ball 54. Second golf ball 54 has followed second trajectory 60 in its flight and has come to rest at a second stopping spot 58. As depicted in FIGS. 7-8, second golf ball 54 does not follow target trajectory 140 from a second lie spot 56 (which lies at roughly the same spot as first lie spot 16) to target spot 150. Second golf ball 54 has instead followed second trajectory 60 to arrive at second stopping spot 58.

FIG. 8 depicts second golf ball 54 in flight from second lie spot 56 to second stopping spot 58. Second golf ball 54 has a back-spin about a second spin axis 62, which was imparted to second golf ball 54 by second golf ball 52. As with first spin axis 22, second spin axis 62 is not horizontal, but is rather at a second side spin angle 63 with respect to a horizontal axis. Like first side spin angle 23, second side spin angle 63 is non-zero. However, second side spin angle 63 is non-zero relative to the horizontal axis in a direction opposite the direction of non-zero first side spin angle 23.

If second side spin angle 63 was zero, and absent any wind, the golf swing may have been a pull (since second golfer 50, like first golfer 10, is golfing right-handed; else, if second golfer 50 were golfing left-handed, the golf swing may have been a push). However, since second side spin angle 63 is non-zero and negative (i.e., tilting slightly to the left), the golf swing may be a draw (or, if first golfer 10 were golfing left-handed, a fade), and if second side spin angle 63 were great enough, the golf swing may have been a hook (or, if from a left-handed swing, a slice). Accordingly, while non-zero and positive side spin angles may alter the trajectory of a golf ball in flight to cause a golf ball to curve to the right, non-zero and negative side spin angles may alter the trajectory of a golf ball in flight to cause the golf ball to curve to the left.

As depicted in FIG. 7, second trajectory 60 is not a straight line from second lie spot 56 to target spot 150. Second trajectory 60 instead curves as second golf ball 54 flies toward target spot 150, and more particularly curves to the right. However, although non-zero and negative second side spin angle 63 imparted to second golf ball 64 when struck by second golf club 62 operates to alter the trajectory of second golf ball 64 to curve to the left, a wind blowing from left to right proves to be a more dominant factory in altering second trajectory 60. As a result, second trajectory 60 curves to the right as did first trajectory 20.

Accordingly, relative to target trajectory 140, second trajectory 60 has a second offline angle 61 the magnitude of which changes during the flight of second golf ball 54. Second offline angle 61 has some non-zero value toward an initial portion of second trajectory 60. Between the initial portion of second trajectory 60 and a final portion of second trajectory 60, second offline angle 61 decreases, as a blowing wind overpowers the spinning of second golf ball 54 about second spin axis 62 at non-zero second side spin angle 63. Ultimately, second offline angle 61 is the same as a second actual angle 65 associated with a second actual distance 64.

Figure 9:
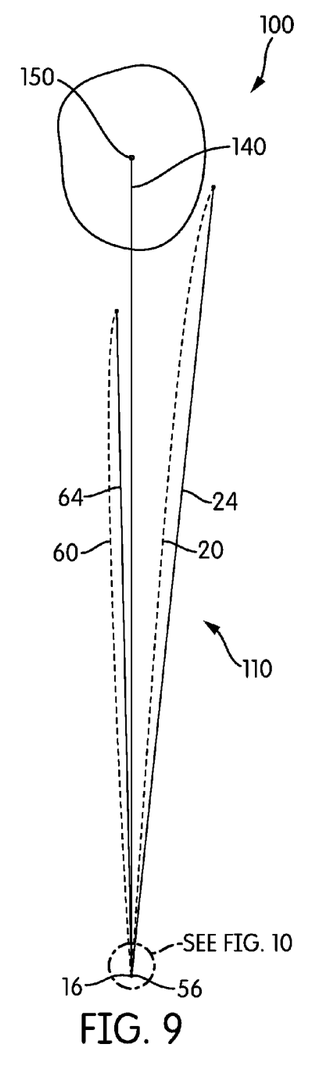
FIG. 9 is a top view depicting the first trajectory and the second trajectory.
Figure 10:
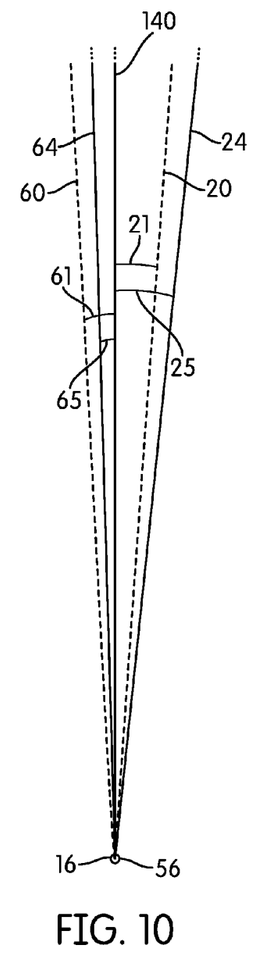
FIG. 10 is a partial top view depicting the first trajectory and the second trajectory.

FIG. 9 depicts first trajectory 20 superimposed with second trajectory 60, while FIG. 10 depicts an early portion of trajectories 20 and 60 depicted in FIG. 9. Although first side spin angle 23 is positive and second side spin angle 63 is negative, blowing winds cause both first trajectory 20 and second trajectory 60 to curve to the right. In particular, as depicted in FIG. 10, an early portion of first trajectory 20 is at first offline angle 21 with respect to target trajectory 140, while first actual distance 24 is at first actual angle 25 with respect to trajectory 140, with first offline angle 21 being less than first actual angle 25. In contrast, while an early portion of second trajectory 60 is at second offline angle 61 with respect to target trajectory 140, second actual distance 64 is at second actual angle 65 with respect to trajectory 140, with second offline angle 61 being greater than second actual angle 65.

Figure 11:
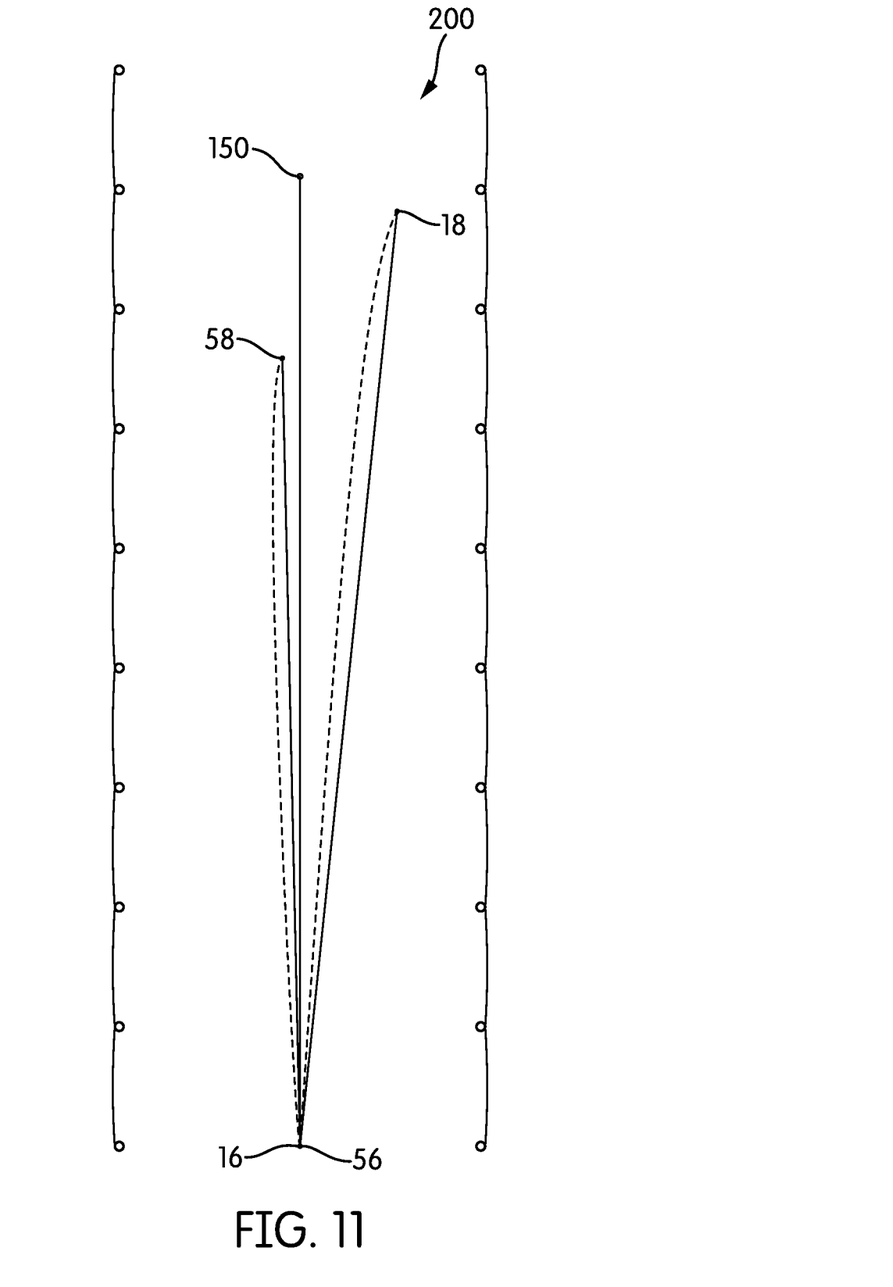
FIG. 11 is a top view depicting an alternate first trajectory and an alternate second trajectory on a driving range.

While FIGS. 1-10 depict golf swings undertaken on golf course 100, golf swings may be undertaken at other locations and under other conditions. For example, FIG. 11 depicts substantially the same golf swings of FIGS. 1-10, but undertaken on an outdoor driving range 200. Being outside, driving range 200 is subject to winds that may be blowing. As depicted in FIG. 11, a wind is blowing similar to the wind blowing in FIGS. 1-10, and as a result first stopping spot 18 and second stopping spot 58 are positioned with respect to first lie spot 16, second lie spot 56, and target spot 150 in a manner similar to that depicted in FIGS. 1-10.

Figure 12:
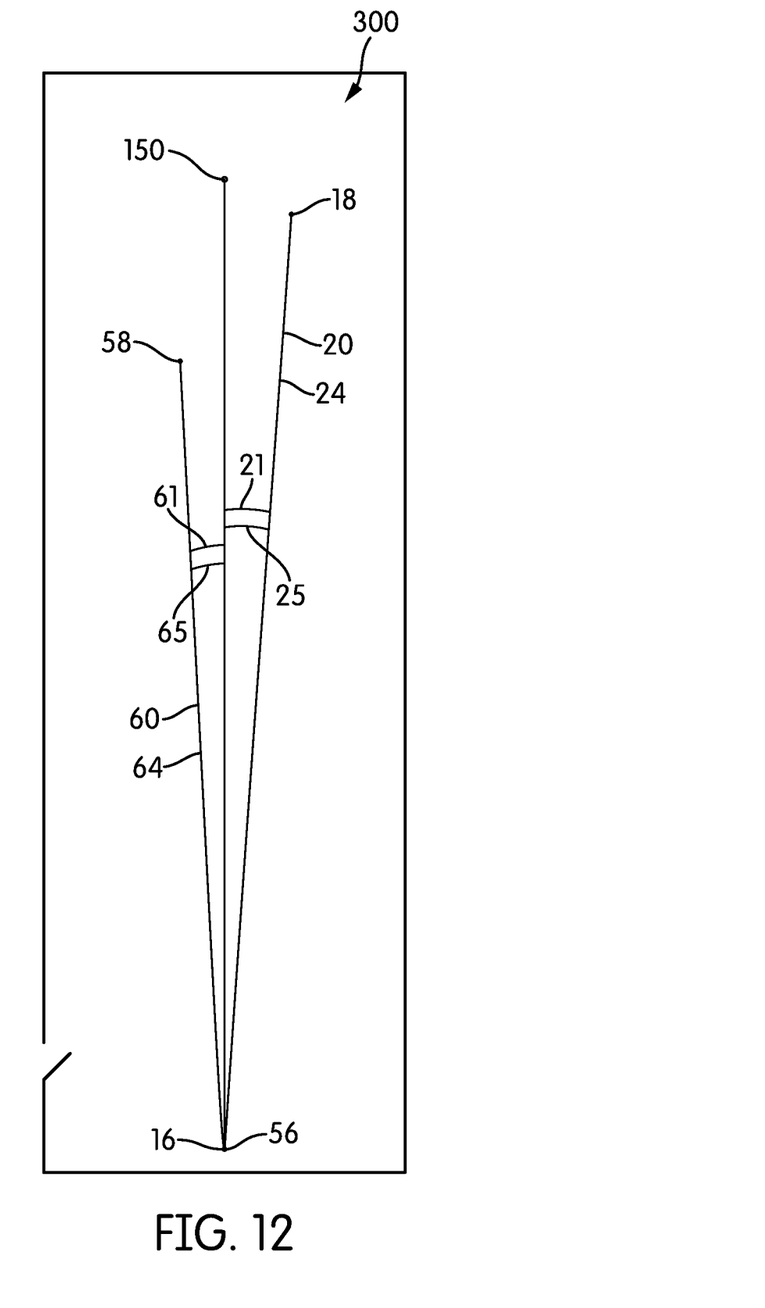
FIG. 12 is a top view depicting another alternate first trajectory and another alternate second trajectory in a first enclosed structure.

In contrast, golf swings may be undertaken under conditions substantially free of blowing winds, such as in controlled environments. For example, as depicted in FIG. 12, substantially the same golf swings as depicted in FIGS. 1-10 are undertaken in a first enclosed structure 300 which extends at least as far as driving range 200, or the portion of fairway 110 depicted in FIGS. 1-10. First enclosed structure 300 may be an indoor driving range, or a large building such as a warehouse or hangar, or any substantially enclosed indoor area or area otherwise sheltered from the elements. As depicted in FIG. 12, first trajectory 20 and second trajectory 60 are not impacted by winds.

However, in contrast with the depiction in FIGS. 1-11, first side spin angle 23 and second spin angle of first trajectory 20 and second trajectory 60 as depicted in FIG. 12 are substantially zero. As a result, in the absence of winds and non-zero side spin angles, first trajectory 20 is to the right of target trajectory 140, and first offline angle 21 of first trajectory 20 and first actual angle 25 of first actual distance 24 are substantially the same. Similarly, second trajectory 60 is to the left of target trajectory 140, and second offline angle 61 of second trajectory 60 and second actual angle 65 of second actual distance 64 are substantially the same.

Accordingly, golf swings that may be used to characterize golf ball striking ability may be undertaken in locations that are physically long enough to encompass an entire trajectory of a struck golf ball, including outdoor locations such as golf course 100 and driving range 200, as well as indoor locations such as first enclosed structure 300. Alternatively, golf swings that may be used to characterize golf ball striking ability may be undertaken in locations that are not physically long enough to encompass an entire trajectory of a struck golf ball.

Figure 13:
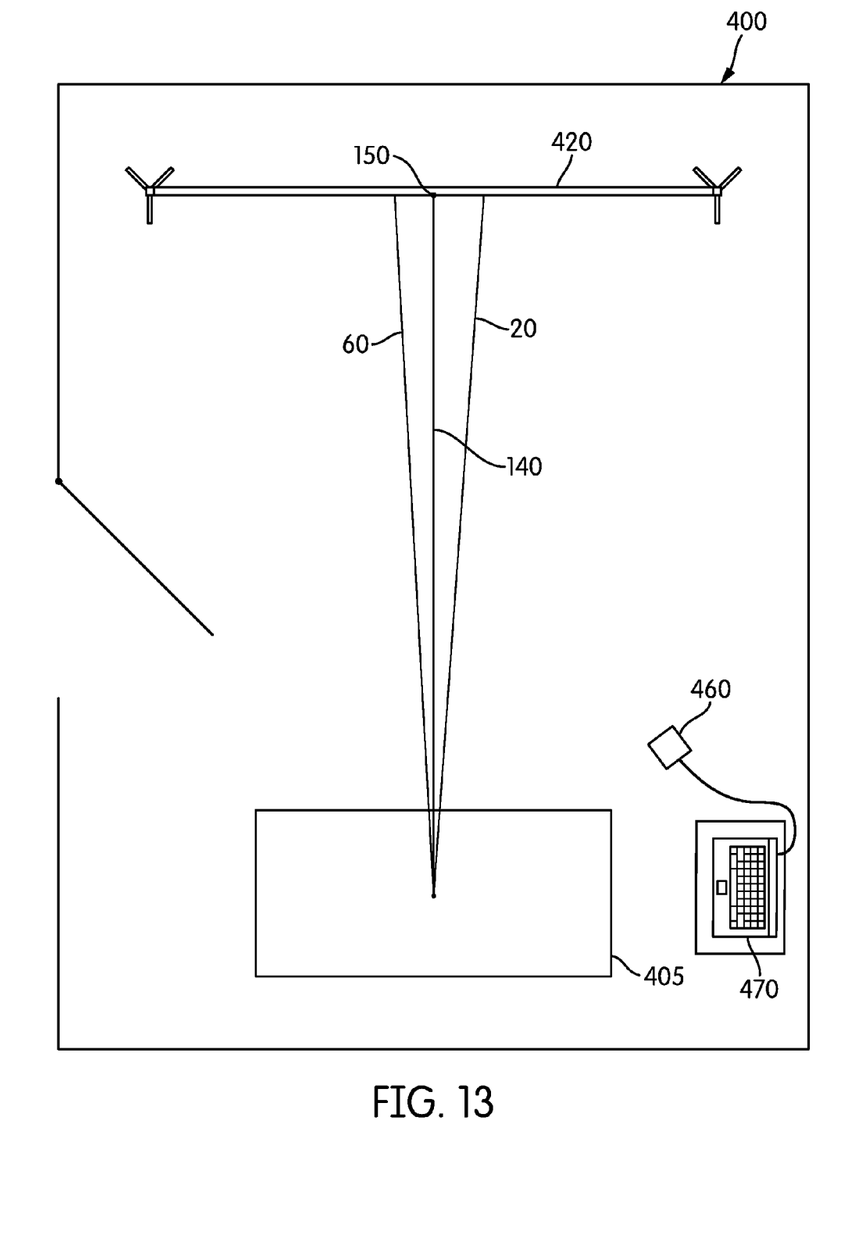
FIG. 13 is a top view depicting another alternate first trajectory and another alternate second trajectory in a second enclosed structure.

For example, as depicted in FIG. 13, such golf swings may be undertaken in a second enclosed structure 400 which is dimensioned to encompass initial portions of trajectories of struck golf balls. Smaller enclosed locations may be advantageous for use in characterizing golf ball striking ability, as they may permit more tightly controlled data-gathering conditions and may facilitate quicker data generation and therefore collection. As depicted, first trajectory 20 begins on a mat 405 and extends to a barrier 420, which may be a material functioning as a net, or a screen, or both. Similarly, second trajectory 60 begins on mat 405 and also extends to barrier 420. A measurement device 460, which may include a launch monitor, acquires data associated with various golf swing parameters. Golf swing parameter measurements may then be inputted into a processing system 470 to determine a golf ball striking ability rating or otherwise characterize a golf ball striking ability.

As with trajectories 20 and 60 depicted in FIG. 12, first trajectory 20 of FIG. 13 is to the right of target trajectory 140, and second trajectory 60 is to the left of target trajectory 140. However, although the initial portion of trajectories 20 and 60 are substantially similar to the initial portion of trajectories 20 and 60 of FIG. 12, first golf ball 14 may have a non-zero first side spin angle 23 and second golf ball 54 may likewise have a non-zero second side spin angle 63, such as the non-zero and side spin angles 23 and 63 depicted in FIGS. 1-10. Although side spin angles 23 and 63 may be non-zero, trajectories 20 and 60 may be interrupted by barrier 420 before any non-zero side spin angles can substantially influence trajectories 20 and 60. That is, in relatively smaller enclosed locations such as second enclosed location 400, there may not be enough room for non-zero side spin angles 23 and 63 to influence trajectories 20 and 60 before barrier 420 cuts trajectories 20 and 60 short.

Accordingly, a golf ball striking ability may be characterized by striking and imparting trajectories to one or more golf balls and measuring various golf swing parameters associated with those strikes. Some golf swing parameters may be associated with the magnitude of a trajectory, such as a distance, a speed, a momentum, or a kinetic energy associated with a golf club head or a golf ball. Other golf swing parameters may be associated with the direction of the trajectory, or an offline (i.e., error) portion of the trajectory relative to a desired or target trajectory, such as an angle associated with the distance, an offline angle relative to a target trajectory, or a side spin angle. On the basis of these measurements, a trajectory magnitude factor and a trajectory offline factor may be established or calculated. The golf ball striking ability characterization may then be obtained by reducing the trajectory magnitude factor on the basis of the trajectory offline factor, such as by subtracting the trajectory offline factor from the trajectory magnitude factor, or by multiplying the trajectory magnitude factor by the trajectory offline factor (for trajectory offline factors that are structured to range from 0 to 1).

For example, in locations that are physically long enough to encompass an entire trajectory of a struck golf ball such as golf course 100, driving range 200, and first enclosed structure 300, one or more golf balls may be struck and the actual distance resulting from each strike may be measured, similar to first actual distance 24 and second actual distance 64 as depicted in FIGS. 1-10. The actual angle associated with each actual distance may also be measured, similar to first actual angle 25 and second actual angle 65 as depicted in FIGS. 1-10. The trajectory magnitude factor may then be associated with the measured actual distance as reduced by the measured offline factor.

In locations that are not physically long enough to encompass an entire trajectory of a struck golf ball, such as second enclosed structure 400, actual distances and actual angles achieved by a golf ball strike are not available to be measured. However, other parameters may be available regardless of whether or not the location is physically long enough to encompass an entire trajectory of a struck golf ball. For example, in second enclosed structure 400, measurement device 460 may measure a golf club head speed and a golf ball speed, and may also measure an offline angle and a side spin angle. These measurements may then be used to establish or calculate a trajectory magnitude factor and a trajectory offline factor.

The trajectory magnitude factor may include the ratio of the golf club head speed to the golf ball speed, which may be referred to as the "smash factor" of a golf swing. This ratio may be normalized with respect to a known or reference trajectory magnitude, such as by dividing the ratio by the known or reference trajectory magnitude (i.e., a reference "smash factor"). The ratio may also be modified by a trajectory magnitude scaling factor, such as by multiplying the ratio by the trajectory magnitude scaling factor. In some embodiments, the ratio may be both normalized with respect to the reference trajectory magnitude and modified by the trajectory magnitude scaling factor. For example, the reference trajectory magnitude may be a trajectory magnitude associated with a certain level of striking ability, such as a "smash factor" that is characteristic of PGA Tour golfers, such as an average "smash factor" of PGA Tour golfers. Additionally, the trajectory magnitude scaling factor may be a number high enough to yield whole numbers that are distinct, while at the same time being low enough to yield whole numbers that are small enough to be manageable, such as a number between 10 and 1000, with 100 being a particularly suitable number.

The trajectory offline factor may include the sum of the side spin angle and the offline angle. In this sum, either of the side spin angle or the offline angle may be modified by a scaling factor, and either of the side spin angle or the offline angle may be modified by a trigonometric function. In some embodiments, the side spin angle may be multiplied by a side spin scaling factor, and the offline angle may be modified by a trigonometric function. For example, the side spin scaling factor may be a number between 0.001 and 0.01, with 0.007 being a particularly suitable number. Additionally, the offline angle may be modified by the sin trigonometric function to become the sine of the offline angle.

Subsequently, the trajectory offline factor may be modified by a trajectory offline scaling factor, which may be a number between 10 and 1000, with 100 being a particularly suitable number. Moreover, instead of reducing the trajectory magnitude factor on the basis of the trajectory offline factor by subtracting the trajectory offline factor from the trajectory magnitude factor, an absolute value of the trajectory offline factor may be subtracted from the trajectory magnitude factor.

In some embodiments, the trajectory magnitude factor and the trajectory offline factor may be established or calculated on the basis of composite values for the golf club head speed, the golf ball speed, the side spin angle, and the offline angle.

Figure 14:
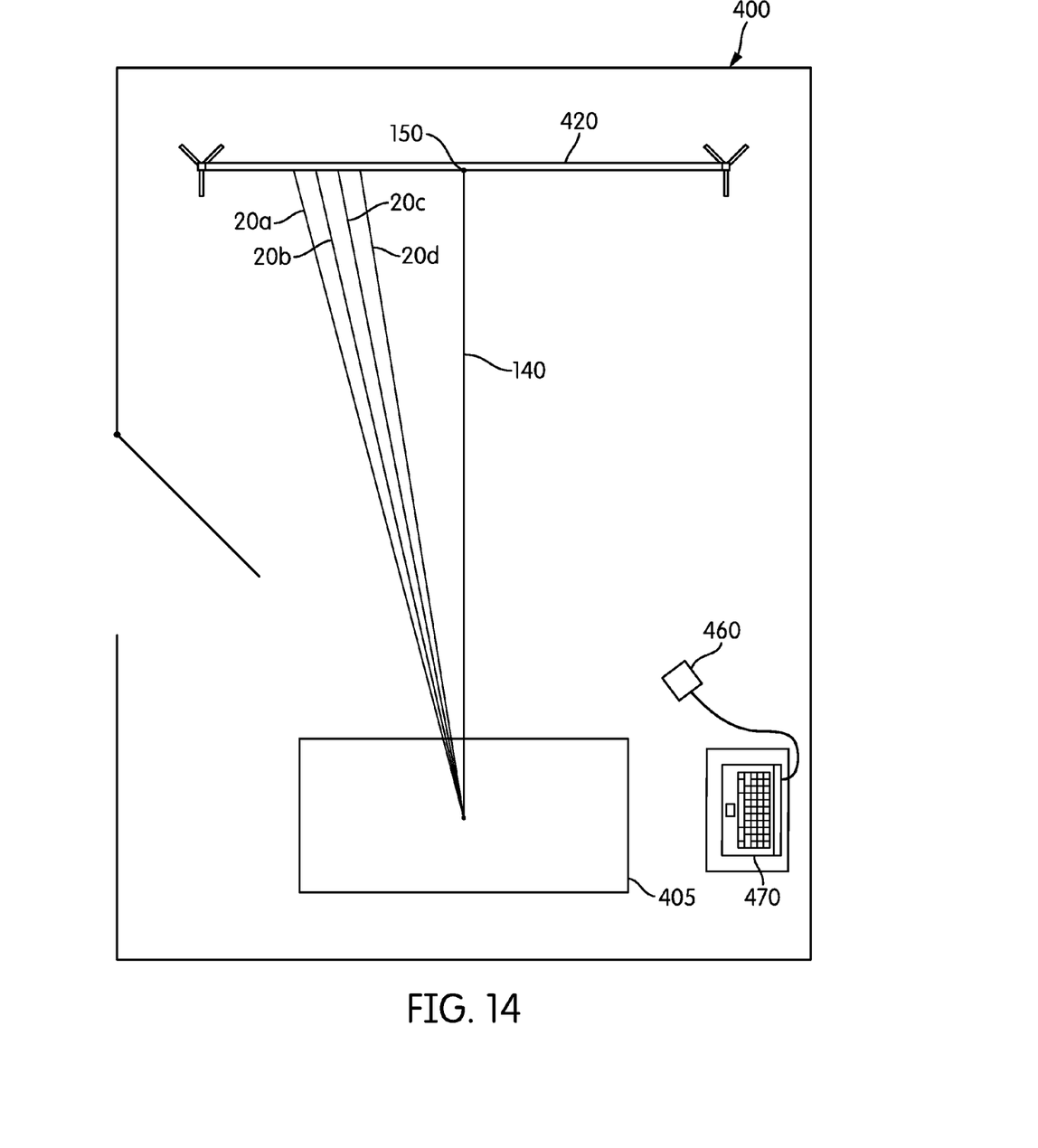
FIG. 14 is a top view depicting further alternate trajectories in the second enclosed structure.

For example, as depicted in FIG. 14, a plurality of golf ball strikes may produce a plurality of trajectories 20a, 20b, 20c, and 20d. Each of trajectories 20a-20d may be measured as having a golf club head speed, a golf ball speed, a side spin angle, and an offline angle relative to target trajectory 140, each of which may differ from the other corresponding measurements associated with the remaining trajectories 20a-20d. Composite values for such measurements across a plurality of trajectories may be arithmetic or geometric means, medians, modes, or other statistically derived values. For example, composite values could be average values of a particular measurement for a plurality of trajectories. (In calculating these composite values, various outliers may be disregarded.)

Alternatively, the trajectory magnitude factor and the trajectory offline factor may be established or calculated on the basis of individual golf strikes, each being measured as having a golf club head speed, a golf ball speed, a side spin angle, and an offline angle. A golf ball striking ability may then be characterized on the basis of the trajectory magnitude factor and the trajectory offline factor associated with each golf strike. Subsequently, a composite golf ball striking ability may be characterized, such as an arithmetic or geometric mean, a median, a mode, or another statistically derived value.

In some embodiments, a characterization of golf ball striking ability may be a golf ball striking ability rating. A golf ball striking ability rating (BSTAR) may comprise at least a trajectory magnitude factor ($TF_M$) and a trajectory offline factor ($TF_O$). The trajectory magnitude factory may be reduced by the trajectory offline factor, such as by subtracting the absolute value of the trajectory offline factor from the trajectory magnitude factor ($TF_M$-ABS[$TF_O$]). The trajectory magnitude factor may include a ratio of a speed of a golf club head to a speed of a golf ball, which may be a "smash factor" as described above (SF, or $v_{club-head}/v_{golf-ball}$), and may be both normalized with respect to a reference trajectory magnitude, which may be a reference "smash factor" as described above ($SF_{ref}$, or $v_{club-head-ref}/v_{golf-ball-ref}$) and modified by a trajectory magnitude scaling factor ($C_M$). The trajectory offline factor may include a sum of a side spin angle ($A_{side-spin}$) modified by side spin scaling factor ($C_{side-spin}$) and a trigonometric function of an offline angle of a trajectory of the golf ball ($f_{trig}[A_{offline}]$), and the sum may be modified by a trajectory offline scaling factor ($C_O$). In determining the golf ball striking ability rating, any of the golf club head speed, the golf ball speed, the side spin angle, or the offline angle may be a single measured value or a composite value based upon a plurality of measured values.

That is, a golf ball striking ability rating may be represented as:

$$BSTAR = TF_M - ABS(TF_O)$$

Where the trajectory magnitude factor and trajectory offline factor may be represented as:

$$TF_M = (C_M)*(SF/SF_{ref})$$

$$TF_O = (C_O)*([C_{side-spin}*A_{side-spin}] + [f_{trig}(A_{offline})])$$

In some exemplary embodiments, the values above may fall within exemplary ranges of numbers and may be particularly suitable numbers. The trajectory magnitude scaling factor ($C_M$) may be a number between 10 and 1000, with 100 being a particularly suitable number. The trajectory offline scaling factor ($C_O$) may be a number between 10 and 1000, with 100 being a particularly suitable number. The side spin scaling factor ($C_{side-spin}$) may be a number between 0.001 and 0.01, with 0.007 being a particularly suitable number. Additionally, the trigonometric function of the offline angle ($f_{trig}$) may be the sine trigonometric function.

Accordingly, an exemplary golf ball striking ability rating may be represented as:

$$BSTAR = TF_M - ABS(TF_O)$$

Where an exemplary trajectory magnitude factor and an exemplary trajectory offline factor may be represented as:

$$TF_M = (100)*(SF/SF_{ref})$$

$$TF_O = (100)*([0.007*A_{side-spin}] + [\sin(A_{offline})])$$

Related methods of characterizing golf ball striking ability may include (a) a step in which one or more golf strikes is performed, (b) a step in which each of the one or more strikes is measured to determine a golf club head speed, a golf ball speed, a side spin angle, and an offline angle, and (c) a step in which either single values or composite values for each of the golf club head speed, the golf ball speed, the side spin angle, or the offline angle is used in calculating a trajectory magnitude factor and a trajectory offline factor. The characterization of golf ball striking ability may then be the trajectory magnitude factor reduced by the trajectory offline factor.

Systems for characterizing golf ball striking ability may include a number of components. Such systems may include at least one automated measurement device for obtaining measurements related to golf club head speed, golf ball speed, side spin angle, and offline angle, such as a launch monitor, a device including a launch monitor, or a device effectively acting as a launch monitor, such as a camera. A database for storing a plurality of golf strike parameter values may also be included. Such systems may also include a determining device for determining values for golf club head speed, golf ball speed, side spin angle, and offline angle on the basis of measurements taken by the automated measurement device. A calculating device for calculating a trajectory magnitude factor and a trajectory offline factor on the basis of the determined values may also be included, as may a reducing device for reducing the trajectory magnitude factor on the basis of the trajectory offline factor. Such systems may also include an output device for outputting the reduced trajectory magnitude factor.

In addition, two or more of these devices may share physical resources with each other. For example, in some embodiments, the device for determining values based on measurements may be physically implemented with and share resources with the measurement device for obtaining measurements. Alternatively, the device for determining values may be physically separate from and receive inputs from the measurement device. As a further example, in some embodiments the device for determining values may be physically implemented with and share resources with, for example, the calculating device, the reducing device, or both.

As measurements of golf skill, golf ball striking ability ratings such as those described above may have a number of advantages over other measurements of golf skill, such as handicap numbers. With handicap numbers, for example, a golfer's performance relative to individual par values of various holes necessarily relates to all the variables that may possibly impact the golfer's game, including variables related to skill, but also including temporary environmental variables (such as weather) and variables relating to the specific physical environments (i.e., golf courses, or holes of golf courses) over which the golfer's performance relative to par is measured. Accordingly, since two handicap values may reflect data taken under two sets of different conditions, comparison of the two values may be rough or otherwise imprecise. In contrast, data gathered in the course of determining a golf ball striking ability rating may advantageously be controlled at a very fine level, beginning with variables such as golf balls and golf clubs used and proceeding down to the temperature and humidity of the space used to gather the data.

Additionally, par is a relatively coarsely-grained value, i.e., a relatively low number. Accordingly, performance against par is relatively coarsely-grained as well. Golf ball striking ability ratings, on the other hand, may advantageously be determined very precisely, by adjusting various scaling factors as well as by gathering data over statistically significant sets of golf swings and golf ball strikes under substantially similar and controlled conditions.

Moreover, since performance relative to par may be self-determined and self-reported, handicap may be susceptible to incompleteness or inaccuracy, depending upon the skill and diligence of those gathering and tallying the performance data. In contrast, golf ball striking ability ratings may advantageously be well-controlled and may be obtained subject to data objectively gathered and processed.

Furthermore, when the ratio of the golf club head speed to the golf ball speed (i.e., a "smash factor" as described above) is normalized, such as by dividing it by a known or reference trajectory magnitude (i.e., a reference "smash factor" as described above, such as a "smash factor" that is characteristic of PGA Tour golfers), golf club head speed may be diminished as a contributor to the golf ball striking ability rating. As a result, a golfer's golf ball striking ability rating may advantageously be an improved measure of the extent or degree to which the golfer is maximizing their potential striking ability. That is, the golf ball striking ability rating may aid in evaluating whether the golfer is hitting as well as the golfer can, or in evaluating how well the golfer is striking the ball independent of head speed.

Once determined, golf ball striking ability ratings may be used in various contexts. Golf ball striking ability ratings may be used to directly compare the performance of two golfers. For example, a player ability rating may include a driver distance, such as an actual distance, divided by a golf club head speed, which may be multiplied by a golf ball striking ability rating.

Characterizations of golf ball striking ability and methods of characterizing golf ball striking ability may also be useful in methods of selecting various pieces of golf equipment that may be suitable for a particular golfer. For example, golf ball striking ability ratings for a particular golfer may be separately determined against a first trajectory imparted to a first golf ball by a first golf club, and a second trajectory imparted to a second golf ball by a second golf club. Thereafter, if the striking ability rating determined for the second trajectory is less than the striking ability rating determined for the first trajectory, one of either the first golf ball or the first golf club may be selected for the golfer. Alternatively, if the striking ability rating for the second trajectory is not less than (i.e., is greater than or equal to) the striking ability rating for the first trajectory, one of either the second golf ball or the second golf club may be selected for the golfer.

In some embodiments, one of the pieces of golf equipment associated with the first trajectory and the second trajectory may be the same. For example, the first golf club and the second golf club may be the same (meaning that they may be identically the same piece of equipment, or may be different copies of the same or substantially the same make and model of equipment). In such embodiments, the comparison of the striking ability rating for the first trajectory and the striking ability rating for the second trajectory may determine the selection of either the first golf ball or the second golf ball. Alternatively, if the first golf ball and the second golf ball are the same, the comparison of the striking ability rating for the first trajectory and the striking ability rating for the second trajectory may determine the selection of either the first golf club or the second golf club.

Figure 15:
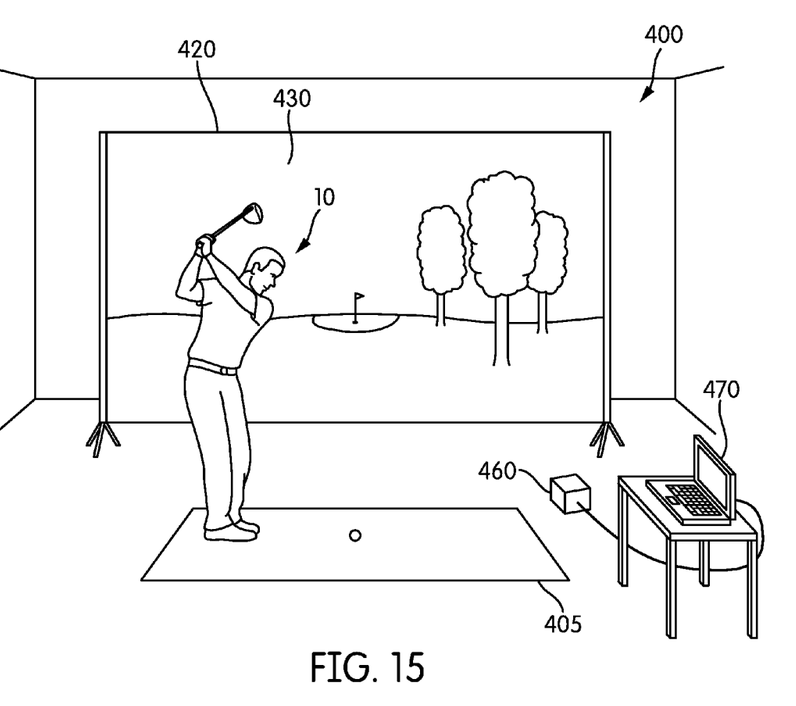
FIG. 15 depicts the first golfer beginning a golf swing at an image in the second enclosed structure.

Golf ball striking ability ratings could also be used as inputs in simulated golf games. FIG. 15 depicts first golfer 10 in second enclosed structure 400. First golfer 10 is beginning to swing a golf club at a golf ball. Here, first golfer 10 is aiming at an image 430 projected on barrier 420, which is being used both as a net and as a screen. Image 430 is a simulated depiction of target spot 150 on fairway 110 of golf course 100. Measurement device 460 is positioned to measure swings made by first golfer 10 and transmit measurement information to processing system 470, which may use both information about the swings as well as a golf ball striking ability rating for first golfer 10 to simulate a result.

For example, first golfer 10 may swing and strike the golf ball, hitting it toward barrier 420 and imparting a trajectory to it. Measurement device 460 may measure parameters associated with the trajectory, such as angles of the trajectory, and may determine a simulated stopping spot on the basis of the golf ball striking ability rating for first golfer 10 in combination with those parameter measurements. Image 430 may then be modified to reflect the determined simulated stopping point, and first golfer 10 may proceed with further swings. In this manner, a simulated game of golf may be played on golf course 100, or any other golf course, by one or more golfers.

Figure 16:
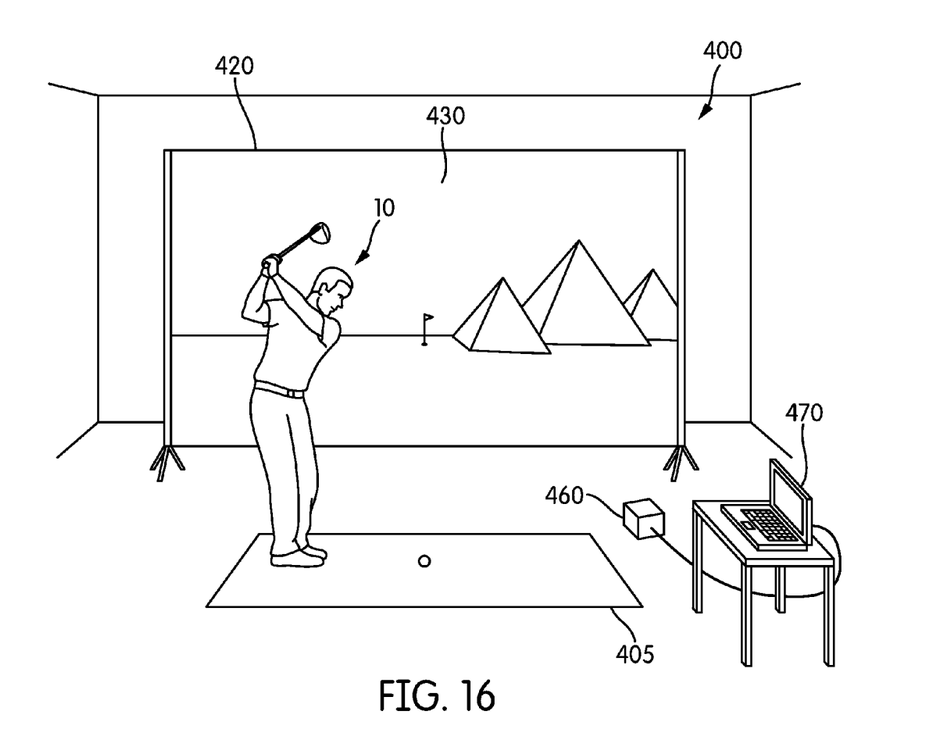
FIG. 16 depicts the first golfer beginning another golf swing at an alternate image in the second enclosed structure.

Furthermore, image 430 may alternatively be any of a variety of simulated depictions of target spots in locations other than golf courses. For example, as depicted in FIG. 16, first golfer 10 is beginning to swing a golf club at a golf ball, but image 430 depicts a non-golf course environment.

Golf ball striking ability ratings may also be determined for a golfer corresponding with each club of a range of clubs, such as each club across a range of golf clubs available in a golf bag. That is, one or more golf strikes may be performed in which each of a plurality of golf clubs strikes a golf ball to impart a trajectory to the ball. Subsequently, a golf ball striking ability rating may be determined for each of the plurality of golf clubs, which may be based upon a single golf strike, or may be a composite based upon a plurality of golf strikes.

Alternatively, a range of golf clubs may be separated into sub-ranges, and golf ball striking ability ratings may be determined for a golfer corresponding with each sub-range of the range of golf clubs. For example, a range of golf clubs in a bag of golf clubs may be separated into sub-ranges, such as woods, long irons, and short irons, and one or more golf strikes may be performed in which each club of the range of clubs strikes a golf ball to impart a trajectory to the ball. Subsequently, a golf ball striking ability rating may be determined for each of the sub-ranges of the range of golf clubs, which may be a composite based upon a plurality of the golf strikes for the golf clubs within a particular sub-range.

Once a golf ball striking ability rating has been determined, it may be compared with a scale of categories or grades to associate the rating with a category or grade. A golfer may then use the associated category or grade to select equipment suitable for improving the golfer's performance. There may be as few as two or three categories or grades, or as many as five or ten. The categories or grades may fall within a total range of golf ball striking abilities between 50 and 125, for example, and boundaries between the categories or ranges may be evenly distributed throughout the total range. In exemplary embodiments including five categories or grades, a first boundary may be a number between 80 and 100, a second boundary may be a number between 70 and 90, a third boundary may be a number between 60 and 80, and a fourth boundary may be a number between 50 and 70.

For example, a first boundary may be 90, a second boundary may be 80, a third boundary may be 70, and a fourth boundary may be 60. In turn, a scale of categories or grades may include a first range of golf ball striking ability ratings above 90, a second range from 90 to 80, a third range from 80 to 70, a fourth range from 70 to 60, and a fifth range below 60. A golfer for whom at least one golf ball striking ability rating has been determined for one club within a range of clubs, or for a sub-range of clubs within a range of clubs, may then select a piece of equipment (such as a club or a ball) designated by category or grade as being suitable to improve the performance of the golfer with that club or sub-range of clubs.

More particularly, the golfer may select a piece of equipment having a property, such as a property of forgiveness, that is likely to be suited to improving the game of the golfer. A golfer having a higher golf ball striking ability rating may be able to improve performance through use of equipment that is less forgiving, such as a golf club or a golf ball designed for the benefit of golfers having a greater degree of swing control. However, such equipment may not improve performance of all golfers. Performance may even decrease for golfers with lesser degrees of swing control who are accordingly unable to take advantage of the less forgiving equipment. Golf ball striking ability ratings may advantageously be used to help golfers select those golf clubs and those golf balls most likely to benefit them, given the category or grading of their golf ball striking ability rating or ratings.

While various embodiments of the invention have been described, the description is intended to be exemplary rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for selecting a piece of golf equipment, the method comprising steps of:
   (i) monitoring, using a launch monitor, an impact between (a) a first golf ball and a first golf club, wherein the impact of the first golf club imparts a first trajectory to the first golf ball, and (b) a second golf ball and a second golf club, wherein the impact of the second golf club imparts a second trajectory to the second golf ball;
   (ii) measuring one or more magnitude parameters and one or more offline parameters of the first trajectory and the second trajectory;
   (iii) establishing, for each of the first trajectory and the second trajectory, (a) a trajectory magnitude factor based upon the one or more magnitude parameters and (b) a trajectory offline factor based upon the one or more offline parameters;
   (iv) determining, via a processor in communication with the launch monitor, a striking ability rating for each of the first trajectory and the second trajectory, based upon a difference between the trajectory magnitude factor and the trajectory offline factor; and
   (v) selecting (a) if the striking ability rating for the second trajectory is less than the striking ability rating for the first trajectory, a piece of golf equipment from a group consisting of the first golf ball and the first golf club, and (b) if the striking ability rating for the second trajectory is not less than the striking ability rating for the first trajectory, a piece of golf equipment from a group consisting of the second golf ball and the second golf club.

2. The method of claim 1, wherein the one or more magnitude parameters are selected from a group comprising a golf club head speed and a golf ball speed.

3. The method of claim 1, wherein the trajectory magnitude factor comprises a ratio of the golf club head speed to the golf ball speed.

4. The method of claim 1, wherein the trajectory magnitude factor is normalized with respect to a reference trajectory magnitude.

5. The method of claim 4, wherein the trajectory magnitude factor further comprises the ratio modified by a trajectory magnitude scaling factor.

6. The method of claim 1, wherein the one or more offline parameters are selected from a group comprising a side spin angle and an offline angle.

7. The method of claim 6, wherein the trajectory offline factor comprises a sum of (a) the side spin angle modified by a side spin scaling factor and (b) a trigonometric function of the offline angle.

8. The method of claim 7, wherein the trajectory offline factor further comprises an absolute value of the sum modified by a trajectory offline scaling factor.

9. The method of claim 1, wherein the step of measuring further comprises using a launch monitor to measure at least one of the magnitude parameters and at least one of the offline parameters.

10. The method of claim 1, wherein the first golf club and the second golf club are the same, and wherein the step of selecting further comprises selecting either the first golf ball or the second golf ball.

* * * * *